F. BILLINGS ET AL.
LOADING MACHINE.
FILED SEPT. 18, 1920. 5 SHEETS-SHEET 5

Inventors
Frank Billings
and
Robert P. Greenleaf
by Thurston, Kwis & Hudson Attys Patented Feb. 6, 1923.

1,444,056

UNITED STATES PATENT OFFICE.

FRANK BILLINGS AND ROBERT P. GREENLEAF, OF CLEVELAND, OHIO; SAID GREENLEAF ASSIGNOR TO SAID BILLINGS.

LOADING MACHINE.

Application filed September 18, 1920. Serial No. 411,193.

*To all whom it may concern:*

Be it known that we, FRANK BILLINGS and ROBERT P. GREENLEAF, citizens of the United States, and residents, respectively, of Cleveland, in the county of Cuyahoga and State of Ohio, and Cleveland, in the county of Cuyahoga and State of Ohio, have invented a certain new and useful Improvement in Loading Machines, of which the following is a full, clear, and exact description.

This invention relates to loading machines, and has particular reference to machines of the general type shown in our prior Patents No. 1,286,168, November 26, 1918, and No. 1,322,476, November 18, 1919, wherein a shovel is actuated so as to cause it to scoop up material in front of the machine and to deliver it over the body of the machine into a car at the rear.

One of the objects of the present invention is to provide means whereby as the shovel reaches dumping position it is given an extra turning movement in addition to the swing of the shovel supporting arms so as to obtain a better discharge of material into the receiving car.

Further the invention aims to provide a loading machine having a digging or conveying element which may or may not be of the shovel type carried by a turntable or horizontal swinging member which swings about a vertical axis so that the digging member may reach material at the sides as well as in front of the machine, and to provide means whereby the turntable is automatically swung in the desired direction and to the desired point during a part of the forward stroke of the digging member and on a part of its rearward stroke is automatically returned to its mid position so that the material will be delivered centrally of the machine.

A still further object is to provide in a machine of the shovel type, an adjustable shovel bottom by which the inclination of the digging edge and bottom of the shovel can be varied as desired.

The invention may be briefly summarized as consisting in certain novel details of construction, and combinations and arrangements of parts which will be described in the specification and pointed out in the appended claims.

In the accompanying sheets of drawings wherein we have shown one embodiment of our invention, Fig. 7 is a view of the front part of the machine with the shovel in digging position.

Figure 2:
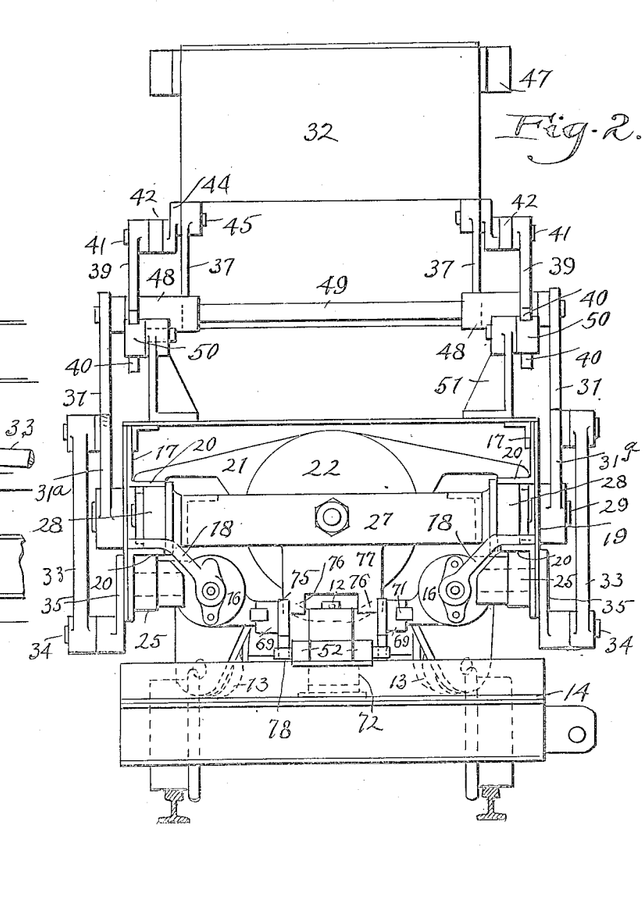
Fig. 2 is a front view of the machine with the shovel elevated and at dumping position as in Fig. 1.
Figure 3:
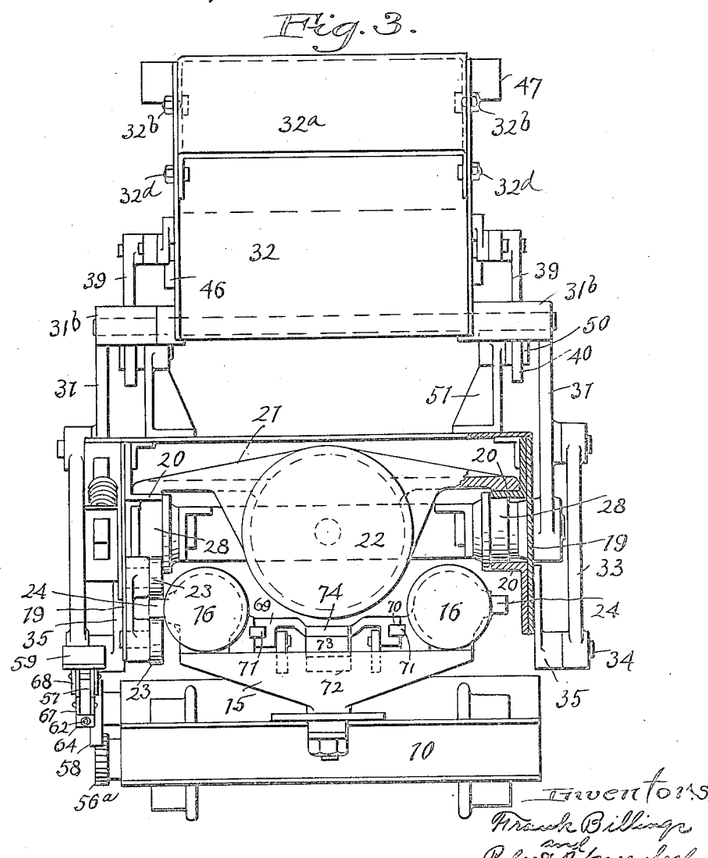
Fig. 3 is a rear view of the machine with the shovel in the same position as in Fig. 2.

The machine includes a truck 10 having wheels adapted to travel along a track, which may be a track laid in a mine, this machine being adapted particularly for use in a mine to load ore, coal, or other material in a car 11 which also is adapted to travel along the mine track. Pivotally supported to swing horizontally on this truck frame through the medium of a king-bolt 12 connected to the rear end of the truck frame and by means of forwardly disposed rollers 13 engaging an arc-shaped track 14 of the truck frame, is a frame or turn-table 15 on which all the digging mechanism is supported. The frame or turntable 15 is in plan substantially U-shaped, and in this instance the sides of the frame are formed by two cylinders 16 of two horizontally disposed laterally spaced fluid pressure motors which are adapted to reciprocate a ram 17 on the frame. The forward ends of the plungers of these motors are separately connected to the ram through the medium of arms or brackets 18 shown in Fig. 2. The ram is composed of a pair of side plates 19, each having a pair of angles 20 on the inner face thereof, these side plates being bridged at the rear by a casting 21 of a cylinder 22 of a fluid pressure motor which actuates a carriage or trolley to swing the shovel and shovel arms to be hereinafter referred to. The ram is slidingly supported on the frame or turntable 15 by rear rollers 23 (see left hand side of Fig. 3) which engage guides 24 on the outer sides of the two ram actuating cylinders 16, and by forward rollers 25 which are supported at the forward ends of the frame or turntable 15 and are engaged by flanges of angles projecting inwardly from the sides of the ram (see Fig. 2). The plunger 26 of the upper fluid pressure motor of which the cylinder 22 is a part, is connected to the forward portion of a trolley or carriage 27 (see Fig. 6) having rollers 28 which travel back and forth in the guideways formed by the inwardly extending flanges of the angles 20 carried by the sides of the ram. The axles 29 of the rear wheels or rollers 28 project outwardly through guide slots 30 in the side plates of the ram, and mounted on these axles 29 are shovel supporting arms 31 carrying a digging and conveying shovel 32. The manner in which the shovel 32 is connected to the arms 31 will be referred to presently. The inner ends of the shovel supporting arms 31 are in the form of bell-cranks, and pivotally connected to the free ends of the relatively short arms or extensions 31$^a$ of the arms 31 are links 33, the inner or rear ends of which are pivoted at 34 to brackets 35 on opposite sides of the ram 17. The function of these arms or links 33 is to cause the shovel and shovel supporting arms to be revolved when the carriage or trolley 27 is moved along the guideways of the ram, the parts 33 serving to swing the shovel and shovel arms upwardly and rearwardly to dumping position when the carriage is moved rearwardly with reference to the ram; and to swing the shovel and shovel supporting arms downwardly to digging position when the carriage is moved forwardly relative to the ram as more fully described in the prior application of Robert P. Greenleaf, one of the inventors herein, Serial No. 311,591, filed July 17, 1919. It will be understood that when the ram is actuated, the shovel is carried with it, and when the trolley or carriage 27 is actuated by the upper fluid pressure motor the shovel will be swung upwardly and rearwardly over the machine to dumping position, or downwardly and forwardly to digging position, and it will be understood that by actuating the ram and carriage or trolley 27, the shovel can be filled at the front of the machine, either by movement of the ram alone, or by the simultaneous movement of the ram and carriage, in which event the shovel will be given a forward and upward filling movement, and it will be understood also, that after the shovel is filled, it can be retracted by the retraction of the ram, and then swung over the machine to dumping position by the rearward movement of the carriage, or the retraction of the ram and the swinging movement can be imparted simultaneously.

In our prior patents, previously referred to, and in the co-pending Greenleaf application, the shovel is rigidly secured to the shovel supporting arms so that the material is discharged at the rear of the machine by the swinging movement of the shovel, which is identical with the movement of the arms which support the shovel. In the present case, and in accordance with one part of the present invention, the shovel is so mounted on the arms and connected thereto in such a way that the shovel is given an extra or special turning or dumping movement as the arms are approaching the rear limit of their swinging movement.

Considering now this part of our invention it will be observed that the outer portions of the arms 31 are somewhat bell-crank shaped, the ends 31$^b$ being inclined somewhat with reference to the main portions of the arms. The extreme ends of the arms are pivoted at 36 to a casting 37 which is bolted to the rear wall of the shovel, the points of connection 36 being near what is normally the upper edge of the shovel. Pivotally connected at 38 at the bend or junction of the parts 31$^b$ of the arms with the straight main portions thereof, are forked arms 39 whose inner ends have forks 40, and whose outer ends are pivotally connected at 41 to links 42 which are pivotally connected at 43 to links 44 which in turn are pivotally connected at 45 to the casting 37. On each side of the shovel there is a stop lug 46 adapted to be engaged by the link 44, and on each side of the shovel there is also a lug, or what may be termed a locking lug 47 which is adapted to be engaged by a nose 42$^a$ at the inner end of the link 42. Projecting inwardly from the forked arms 39 at the points where they are connected to the shovel supporting arms 31 are bosses 48 through which extend a shaft or rod 49 which connects together the two pairs of associated arms 31 and 39.

At the rear end of the ram are rollers 50 which are supported on brackets 51, the position of these rollers 50 being such that near the end of the retraction of the carriage 27 and near the end of the rearward swinging movement of the shovel and shovel supporting arms the forks 40 engage these rollers and cause the shovel to be released from the normally locked position, and to be given a quick turning or dumping movement which discharges the material into the receiving car 11. It might be stated by way of explanation of the operation of these parts that normally the noses at the inner ends of the links 42 engage over the locking lugs 47 on the sides of the shovel and hold the shovel against the bosses 48, as shown in Fig. 7. In this manner the shovel is rigidly held on the shovel supporting arms during the digging or filling stroke and during all portions of the swinging movement except the extreme end of the rearward swinging movement and the beginning of the forward swinging movement, but during the dumping movement when the carriage has been almost wholly retracted, the forks 40 engage the rollers 50 and are swung by the latter relative to the arms 31. The effect of this is to first shift the links 42 in an endwise direction sufficient to carry the noses 42ª of these links inward from the locking lugs 47. This brings the links 44 up against the stop lugs 46, and then further movement of the forked arms swings the shovel with a quick dumping movement about the points 36, and when the carriage 27 is fully retracted, the shovel is in the position shown by full lines in Fig. 1 with what is normally the rear wall substantially vertical.

On the forward movement of the shovel, since the forks still engage the rollers 50, the shovel is swung back until the rear wall thereof rests on the bosses 48, and just before the forks leave the rollers 50 the links 42 are again moved in an endwise direction until the noses 42ª slide over the locking lugs 47, whereupon the shovel is locked to the shovel supporting arms, ready for the next digging or filling stroke, and further forward movement of the carriage swings the shovel supporting arms and shovel as a unit back to digging position from the machine.

A further important feature of the present invention resides in the mechanism whereby material located at the side of the machine as well as directly in front of it can be scooped up and the digging element brought back to position so as to discharge squarely into the receiving car 11 without requiring a separate motor or equivalent means for swinging the turntable. It might be stated before taking up the details of this part of our invention that in a machine of the shovel type, when the turntable is swung so that the shovel will scoop up material at the side of the machine, unless the shovel is swung back to the center line of the machine after it is filled, the material may be thrown over the car when the shovel reaches dumping position instead of into it, and therefore it is generally necessary for the operator first to swing the turntable laterally in one direction so that the shovel will be moved outwardly at the desired angle to pick up the material intended, and after the shovel is filled, to swing the turntable back until the shovel is in line with the longitudinal axis of the machine before the shovel is swung to dumping position. By our improved mechanism the swinging of the turntable laterally outward from normal position and back again to normal or central position takes place automatically through the movement of the trolley, and the means by which this is accomplished will now be described.

Figure 1:
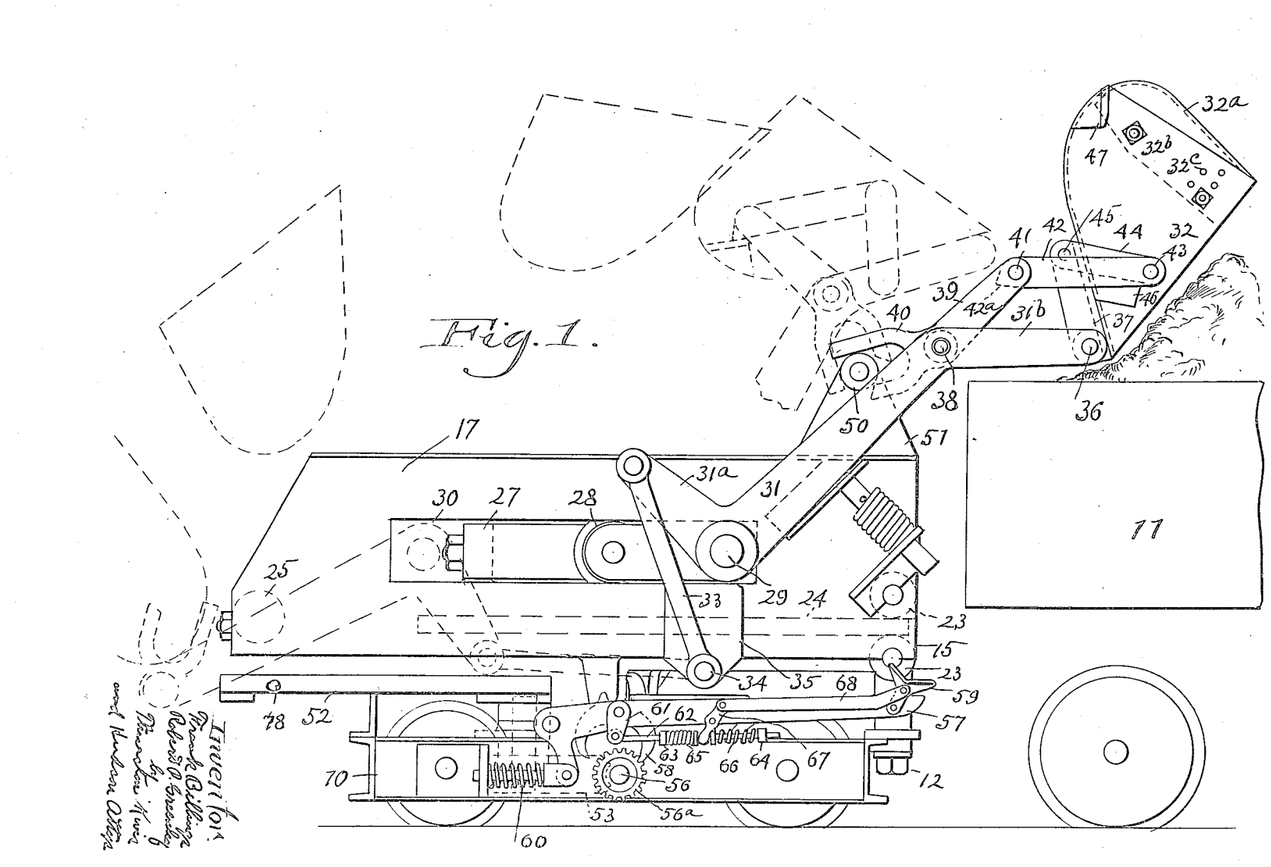
Fig. 1 is a side view of the machine with the shovel shown by full lines at the end of its dumping movement at the rear of the machine, and by dotted lines in other positions.
Figure 4:
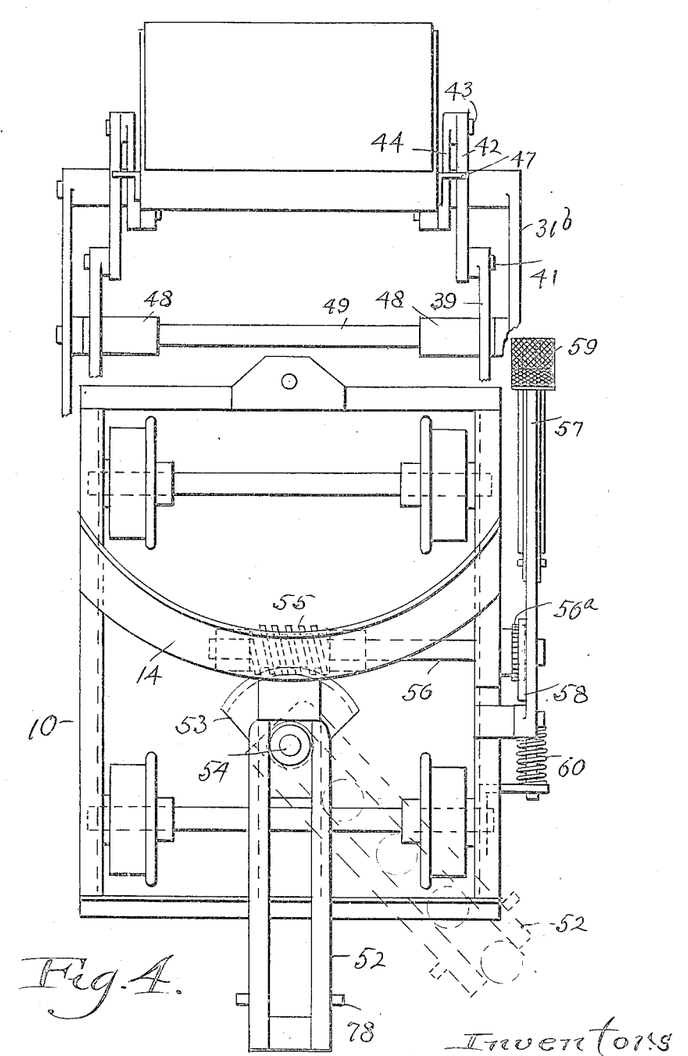
Fig. 4 is a top view of the truck and shovel, this view omitting the turntable and ram.
Figure 5:
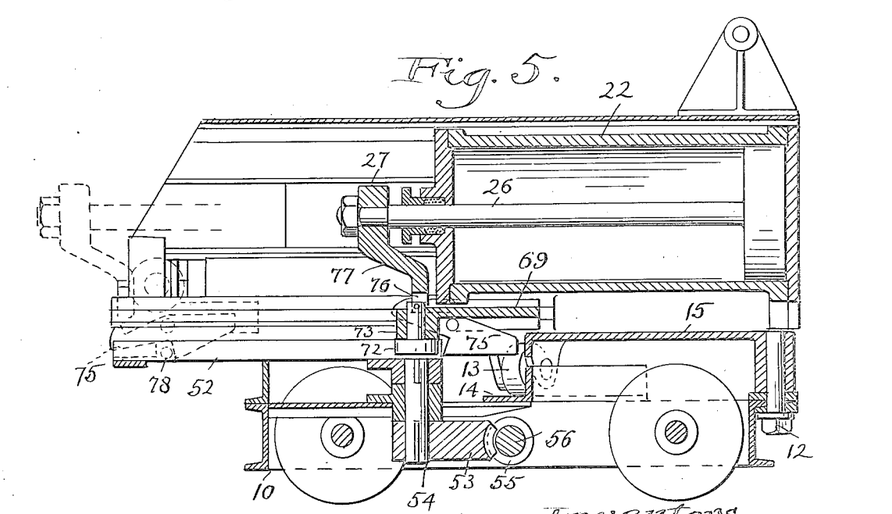
Fig. 5 is a longitudinal sectional view with the shovel parts omitted.

This mechanism includes a slotted guide arm 52 best shown in Figs. 1, 4 and 5, which arm is pivoted to the truck slightly forward of the curved track 14 thereon. This arm can be swung laterally and caused to stand at any desired angle with respect to the center line of the machine within its range of action, by means of a worm gear segment 53 keyed to the bottom of a short vertical shaft 54, to the upper end of which the slotted guide arm 52 is keyed. This segment engages a worm 55 on a horizontal shaft 56 supported by the truck, which shaft extends outward to one side of the machine and may be turned by any suitable mechanism. In this instance a ratchet mechanism is employed for this purpose, including a ratchet wheel 56ª on the outer end of the shaft. This ratchet wheel is actuated through a foot lever 57 by means of a double pawl 58 and reversible foot pedal 59 by which the pawl can be made to drive one side or the other of the ratchet wheel according to the direction in which the operator wishes to shift and set the slotted arm 52. The foot lever 57 is operated by downward pressure on either wing of the reversible pedal 59, and is returned to its highest position by means of a spring 60, just forward of the ratchet wheel. In order that the working nose or point of the double pawl may drag or pass freely over the teeth of the ratchet wheel on the upstroke of the foot lever 57, a double spring arrangement is interposed between the pawl and pedal so as to allow the pawl to pass in and out of the teeth, and at the same time to securely hold the non-working point of the pawl clear of the other side of the ratchet wheel. To this end the pivot of the pawl has attached to it a short arm 61, to the lower end of which is connected a rod 62 on which is a pair of abutments 63 and 64. Between these abutments are two springs 65 and 66 working on opposite sides of a short lever 67 pivoted to the foot lever 57. The upper end of this short lever is connected by a link 68 to the reversible foot pedal 59, just above its point of pivotal connection with the foot lever 57. It will be seen that when the foot lever is operated by downward pressure on one wing of the pedal 59, the pivot pin of the link 68 coming in contact with the body of the foot lever, acting as a stop for pedal 59, one point of the double pawl 58 engages one side of the ratchet wheel and turns it and the shaft 56 and worm 55 in one direcion, and on the upstroke of the foot lever this point of the pawl will ride freely over the teeth of the ratchet wheel. By giving the foot lever the desired number of strokes the slotted arm 52 can thus be swung from normal full line position shown in Fig. 4, to any other desired position. When the pedal 59 is reversed, the opposite point of the double pawl is swung into engagement with the opposite side of the ratchet wheel, and when the foot lever is operated by downward pressure on the other wing of the pedal 59, obviously the ratchet wheel is turned in the reverse direction, and thus the operator is enabled to swing the slotted arm in either direction and to set it in the desired position.

Figure 8:
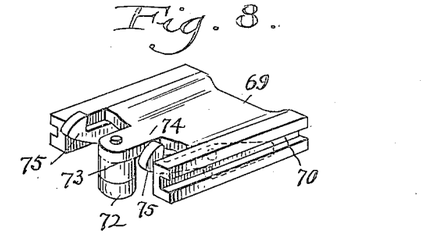
Fig. 8 is a detail perspective view of a sliding plate utilized in automatically swinging the turntable or superstructure in a lateral direction.

Co-operating with the slotted arm 52, is a sliding member 69, carried by the frame or turntable 15. This member is in the form of a substantially square plate with guide slots 70 on its opposite edges engaging co-operating guides 71 (see particularly Figs. 3 and 6) secured to the inner sides of the ram cylinders 16. At the forward end of this sliding member 69 is a roller 72 which engages in the slot 52ª of the slotted arm 52, and is adapted to move back and forth in this slot regardless of the position to which the slotted arm 52 has been adjusted when the trolley or carriage 27 is actuated forwardly and rearwardly. This roller is mounted for rotation in a suitable boss or bearing 73, on a forwardly projecting neck 74 at the front part of the sliding member 69. On each side of the roller the metal of the member 69 is cut back as will be observed from Fig. 8. On both sides of the roller, and pivoted to the portions protruding downwardly to form the guide slots 70 are a pair of counterweighted hooks 75, the upper or hook end portions of which enter the recesses on opposite sides of the roller 72 and boss 73, and between the back of the recessed portions and the inner faces of the hook are spaced adapted to be engaged by a pair of spaced downwardly projecting lugs or feet 76, at the bottom of a downward extension 77 on the trolley cylinder cross-head or front part of the carriage or trolley 27 to which the plunger 26 of the trolley actuating cylinder is connected. This member 77 is formed rigid with the cross-head or carriage 27 and extends downwardly and rearwardly therefrom in the form of a thick plate with a shallow indenture in its center portion so as to clear the axle of the roller 72.

Figure 6:
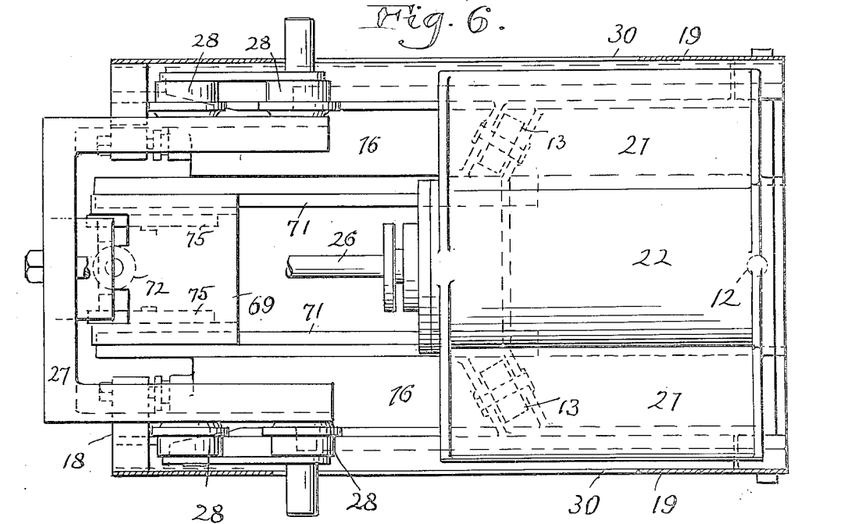
Fig. 6 is a top view of the frame and ram.

Near the outer end of the slotted arm 52 and on the outer edges thereof are a pair of pins 78 which are so positioned that when the plate 77 on the cross-head of the trolley moves the sliding member 69 outwardly until the roller 72 carried by the member 69 is near the outer end of the slot 52ª, these pins engage the lower portions of the counterweight parts of the hooks 75, and lower the forward ends of the hooks so as to release the plate 77 of the trolley cross-head so that when the ram is moved forwardly it will leave the plate standing as shown in Fig. 6 at the forward ends of the guides 71, until the parts are again returned by the retraction of the ram when the feet at the bottom of the plate 77 of the trolley cross-head will again ride over the hooks, and engage the plate at the rear of the hooks and shift it rearward.

The operation of the swinging mechanism is as follows: When the slotted arm 52 is in line with the center line of the truck, the shovel, ram, and other shovel supporting parts will move backwardly and forwardly in the plane of the truck, but if the operator desires the machine to dig at a point to one side of the center of the machine, he will work the foot 57 up and down one or more times with his foot on the desired wing of the reversible foot pedal 59 so that the ratchet wheel is rotated in the desired direction until the slotted arm is moved in the proper direction to the desired angle.

Then with the trolley in its rearmost position, and with the roller 72 which at all times engages in the slot of the arm 52, directly over the pivot of the arm, if the operator then moves the carriage or trolley forwardly so as to swing the shovel from the upper rear dumping position to digging position, the turntable or frame and all parts carried by it will be swung laterally to a position depending on the angular position of the slotted arm 52, the finish of the swinging movement taking place just before the shovel reaches the ground. This swinging movement of the frame from its central position laterally through an angle determined by the angular position of the slotted arm takes place for the reason that during this forward movement of the carriage or trolley 27, the feet at the bottom of the plate 77 carried by the carriage or trolley cross-head engage behind the hooks 75, as a result of which throughout practically the entire forward movement of the carriage or trolley the plate 69 is slid along its guideway on the pivoted frame or turntable, and, of course, the action of the now inclined guide slot 52ª of the arm 52 on the roller 72 of the sliding plate 69 is to swing the entire superstructure until the sliding member 69 reaches the forward limit of its movement. This occurs when the counterweighted hooks 75 engage the pins 78 at the forward end of the slotted arm 52, this taking place just before the shovel reaches the ground or its digging position.

It might be mentioned at this point that the slotted arm cannot be moved by this action out of the position to which it has been previously set or adjusted for the reason that the gear segment and worm which it engages are self-locking gears which hold the arm 52 against lateral swinging movement by the side pressure on the arm. When the plate 77 at the bottom of the carriage or trolley cross-head is released from the plate 69 by the engagement of the hooks with the pins 78 and the depression of the hooks, the ram can be moved forwardly which will then travel in the direction in which the shovel then points.

By this forward movement of the shovel the latter is filled with material at the side of the machine (located at the point where digging was intended by the operator) and as the shovel and ram are retracted and the crosshead of the trolley or carriage is moved inwardly to a certain point, it re-engages the roller supporting plate 69 by passing over the hooks and engaging the plate at the rear of the hooks. Then as the trolley is retracted to bring the shovel over the machine to dumping position, the plate 69 is pushed back, and as the roller 72 travels back along the slot of the inclined guide arm 52, the turntable or superstructure is swung back, and when the shovel reaches dumping position the superstructure is in its middle position so that the material in the shovel is discharged squarely in the receiving car 11. At the start of the rearward movement of the plate above described, as soon as the hooked ends of the rollers move beyond the pins 78 at the forward end of the slotted arm 52, the ends of the hooks rise above the lower end of the plate 77 so that on the forward motion of the trolley after the material has been dumped from the shovel, the superstructure is again turned laterally, and this lateral swinging movement of the shovel outwardly prior to the digging thrust of the ram, and inwardly after the retraction of the ram prior to the swinging, dumping movement of the shovel will take place, the superstructure being swung each time to the predetermined lateral position until the operator wishes the shovel to dig at some other point, in which event he will properly adjust the slotted arm 52 to some other position.

In the above description reference was made to the fact that the lateral swing of the superstructure is brought about by the movement of the trolley along the ram. The operation was so described, for in the normal operation of the machine, generally, though not necessarily the shovel is shifted from dumping position to digging position by the forward movement of the trolley before the ram is moved forwardly for the next filling stroke, and after the shovel is filled the ram will be retracted before the trolley is shifted any considerable distance inward. However, since the slotted arm 52 is carried by the truck or non-swinging part of the machine, and the lateral swing is brought about by the movement of the roller 72 along the slotted arm, the roller being carried by the swinging part of the structure, it is obvious that the lateral swing of the superstructure is not necessarily dependent upon the movement of the trolley relative to the ram, but on the other hand it may be brought about in part at least by the movement of the ram while the trolley is stationary thereon. For example, should the ram be moved forwardly with the shovel in dumping position, the roller 72 would, of course, travel forwardly along the slotted arm, and if the arm is in inclined position, the superstructure would be swung laterally, and after the shovel is filled, should the trolley be moved part way back so as to elevate the shovel to a predetermined point, and then should the ram be retracted, this movement of the ram if sufficient in extent, would swing the superstructure at least part way toward its central position, and the remainder of the swinging movement would then follow from further retraction of the trolley. In brief, therefore, the mechanism for swinging the superstructure automatically either outward or inward is not dependent upon any particular sequence of operations of the trolley and ram, and it follows therefore that the machine may be operated in the manner best adapted for the circumstances or conditions met at any particular time.

A further novel feature of the invention resides in the provision of an adjustable shovel bottom for the shovel 32 by which the angular position of the shovel bottom with reference to the ground may be varied to best adapt the digging part of the machine for any conditions that may be encountered, and also to provide an easy means for renewing that portion of the shovel subject to the greatest wear. This feature consists in the provision of a substantially U-shaped bottom member $32^a$, preferably in the form of a casting, the rear portion of which is formed in the arc of a circle and is pivoted at the center of the arc $32^b$ to the sides of the shovel, the lower portion of the rear wall of the shovel likewise being curved on an arc coinciding with the curvature of the rear part of the shovel bottom. The shovel bottom can be secured to the sides of the shovel in any one of several angular relationships by means of short bolts $32^d$ adapted to pass through the upper part of the shovel bottom near its digging edge, and through selected openings of a series of staggered openings $32^c$ with which the side plates of the shovel are provided. Since the pivot for the bottom member is located at the center of a circular arc, it is possible to swing the bottom member without altering the clearance relationship between the rear portion of the bottom member and the back plate of the shovel.

We have already described the operation of the special dumping mechanism and of the swinging mechanism so that the operation of the machine as a whole will be fully understood without further describing its operation.

Having described my invention, we claim:

1. In a loading machine, a frame, a superstructure mounted for horizontal swinging movement thereon, a conveying element mounted upon said superstructure for movement toward and from the pivot thereof, and means interposed between the frame and conveying element for swinging said superstructure horizontally upon a movement of said conveying member.

2. In a loading machine, a frame, a superstructure mounted for horizontal swinging movement thereon, a conveying element mounted upon said superstructure for movement toward and from the pivot thereof, and means on the frame engageable with said conveying element to swing said superstructure horizontally in one direction upon outward movement of said conveying element and in the opposite direction upon inward movement thereof.

3. In a loading machine, a frame, a superstructure mounted for horizontal swinging movement thereon, a conveying element mounted upon said superstructure for movement toward and from the pivot thereof, and means on the frame engageable with said conveying element to swing the superstructure horizontally, said means on the frame being adjustable to vary the horizontal angular movement of said superstructure.

4. In a loading machine, a frame, a superstructure mounted for horizontal swinging movement on said frame, a shovel carried by the superstructure for movement from filling to dumping positions thereon, means for imparting a filling stroke to said shovel when in filling position, and means controlled by the movement of the shovel to and from filling position for swinging said superstructure horizontally.

5. In a loading machine, a frame, a superstructure mounted for horizontal swinging movement on said frame, a shovel carried by said superstructure for movement from filling to dumping positions thereon, means for moving said shovel back and forth on said superstructure and for simultaneously swinging said superstructure horizontally back and forth, and means for imparting filling and dumping movements to said shovel.

6. In a loading machine, a frame, a shovel, means for operating the shovel so as to give it a filling or digging motion and a swinging motion to dumping position, a shovel supporting member connected to the shovel, and means including a shiftable lever movable with the shovel and shovel supporting member to rotate the shovel with reference to the supporting member to discharge the material therefrom.

7. In a loading machine, a frame, a shovel, a shovel supporting member, means for operating the shovel and shovel supporting member so as to give the shovel a digging or filling movement and a swinging movement to dumping position, shiftable means connecting the shovel and shovel supporting member to rotate the shovel relative to the shovel supporting member to discharge the material therefrom, and means on the frame engageable with said shovel rotating means to operate the same.

8. In a loading machine, a shovel, a shovel supporting member, means for operating the shovel and said member so that the shovel is given a digging or filling motion and a swinging motion to dumping position, and shiftable operating means movable with the shovel and shovel supporting member and engaging the shovel for normally holding the shovel rigid with respect to the shovel supporting member and adapted when shifted to release the shovel and rotate the shovel on the supporting member.

9. In a loading machine, a shovel, a shovel supporting member, means for operating the shovel and said member so that the shovel is given a digging or filling motion and a swinging motion to dumping position, means movable with the shovel and shovel supporting member for normally holding the shovel rigid with respect to the shovel supporting member and for rotating the shovel on the latter, and means on the frame co-operating with said last mentioned means to cause the release and swinging movement of the shovel relative to the shovel supporting member.

10. In a loading machine, a frame, a superstructure thereon adapted to be swung horizontally, a digging member carried by the superstructure and means for operating the same so as to move it forwardly and rearwardly with respect to the superstructure to engage and shift the material to be loaded, and means connecting said operating means and superstructure whereby said operating means swings the superstructure laterally.

11. In a loading machine, a frame, a superstructure thereon adapted to be swung laterally, a digging member and mechanism for moving the digging member forwardly, and rearwardly to discharging position, and means operated by said mechanism on the forward movement of the digging member to swing the superstructure in one direction and on the rearward movement to swing it in the reverse direction.

12. In a loading machine, a frame, a superstructure mounted thereon adapted to be swung about an axis to reach material at the sides of the machine, a digging member carried by said superstructure, means for moving the digging member outwardly to reach material to be loaded and for moving it rearwardly to discharging position, and means co-acting with the moving means for causing the superstructure to be swung outwardly from normal position on the forward movement and backwardly to normal position upon the discharging movement.

13. In a loading machine, a base, a superstructure mounted thereon to swing about an axis, a digging member, power mechanism carried by the superstructure for giving the digging member a forward motion and a rearward swinging motion to discharging position, and means forming a connection between said mechanism and superstructure whereby said power mechanism may be caused to swing the superstructure laterally outward from normal position during a portion of the forward movement and to return the superstructure to normal central position during a portion of the rearward movement.

14. In a loading machine, a base, a superstructure mounted thereon to swing about an axis, and having a shovel and power mechanism adapted normally to give the shovel forward filling and rearward dumping movements, and means under the control of the operator for connecting said mechanism and superstructure, causing said power mechanism to shift the superstructure laterally.

15. In a loading machine, a base, a superstructure mounted thereon to swing about an axis, and having a shovel and power mechanism adapted normally to give the shovel forward filling and rearward dumping movements, and means under the control of the operator for connecting said power mechanism and superstructure and causing said power mechanism to shift the superstructure laterally upwardly and inwardly coincident with outward and inward movements of the shovel.

16. In a loading machine, a normally stationary base, a superstructure mounted on the base to swing laterally about an axis, said superstructure having a shovel, a forwardly and rearwardly moving actuating member, power mechanism for operating it, and means for causing a lateral swing of the superstructure coincident with certain movements of the shovel comprising a guide member carried by the base and a co-operating guided member movable with said forwardly and rearwardly movable member.

17. In a loading machine, a normally stationary base, a superstructure mounted on the base to swing laterally about an axis, said superstructure having a shovel, a forwardly and rearwardly movable actuating member and power mechanism for operating it, means for causing a lateral swing of the superstructure coincident with certain movements of the shovel comprising a guide member carried by the base and a co-operating guided member movable with said forwardly and rearwardly movable member, and means for adjusting the position of said guide member to control the extent of lateral movement of the superstructure.

18. In a loading machine, a base, a superstructure mounted thereon to swing about an axis, a shovel and shovel operating mechanism carried by the superstructure, said shovel operating mechanism including means for giving the shovel a forwardly filling movement and an upward and rearward swinging movement over the machine to dumping position, and means interposed between said mechanism and superstructure whereby said mechanism may be caused to swing the superstructure laterally inward during a portion of the movement to dumping position and laterally outward during a portion of the return movement from dumping position to the point at which the shovel is filled.

19. In a loading machine, a shovel, a power mechanism for giving the shovel a filling stroke and a movement to dumping position, said shovel including side members and a bottom member, said bottom member adapted to be tilted and to be fixed in various positions of adjustment to vary the angularity of the bottom member with reference to the ground.

20. In a loading machine, a shovel and power mechanism for giving the shovel a digging movement and a movement to dumping position, said shovel having side, rear and bottom members, the bottom member having an arc-shaped portion and being pivoted to the side members at the center of the arc, and means for securing the bottom member in various positions of adjustment with reference to the side members to vary the inclination of the bottom member during the digging movement.

21. In a loading machine, a carriage, a superstructure mounted for horizontal swinging movement on said carriage, a shovel carried by the superstructure for movement from dumping to filling positions thereon, and means for moving said shovel to filling position, simultaneously swinging said superstructure laterally with respect to the carriage and for moving the shovel outwardly from the carriage when in filling position to fill the same.

22. In a loading machine, a carriage, a superstructure mounted for horizontal swinging movement thereon, a shovel carried by said superstructure for movement thereon from filling to dumping positions, means for imparting a filling stroke to said shovel when in filling position, the means for moving said shovel on said superstructure to dumping position and for simultaneously swinging said superstructure laterally.

23. In a loading machine, a carriage, a superstructure mounted for lateral swinging movement thereon, a shovel carried by the superstructure and movable over the top of the superstructure from its filling position to its dumping position, and means for automatically swinging said superstructure from a laterally extending position to a position in alignment with said carriage when said shovel is moved from filling to dumping position.

24. In a loading machine, a carriage, a superstructure mounted for lateral swinging movement thereon, a shovel carried by said superstructure and movable over the top of the superstructure from its dumping to its filling position, and means for automatically swinging said superstructure laterally with respect to said carriage upon movement of said shovel from dumping to filling positions.

25. In a loading machine, a carriage, a superstructure mounted for lateral swinging movement thereon, a shovel carried by said superstructure and movable over the top of the superstructure from its filling to its dumping positions and means for automatically swinging said superstructure laterally from its normal position in alignment with the carriage upon movement of said shovel from dumping to filling position and for returning said superstructure to normal position upon movement of said shovel to dumping position.

26. In a loading machine, a carriage, a superstructure mounted for lateral swinging movement thereon, a shovel carried by said superstructure and movable over the top of the superstructure from its filling to its dumping position, means for automatically swinging said superstructure laterally from its normal position in alignment with the carriage upon movement of said shovel from dumping to filling positions, for imparting a filling stroke to said shovel when in filling position, and for returning said superstructure to normal position upon movement of said shovel to dumping position, and means for varying the extent of the angular movement of said superstructure.

In testimony whereof, we hereunto affix our signatures.

FRANK BILLINGS.
ROBERT P. GREENLEAF.